United States Patent [19]

Schröder et al.

[11] Patent Number: 4,757,959
[45] Date of Patent: Jul. 19, 1988

[54] METHOD AND ARRANGEMENT FOR PROVIDING SAFE VERTICAL LANDING OF AIRPLANES AND EXTRINSICALLY SUPPORTED ZERO-RUN TAKEOFF OF AIRPLANES

[76] Inventors: Bärbel Schröder; Günter Schröder, both of Lübbecker Strasse 120, 4950 Minden, Fed. Rep. of Germany

[21] Appl. No.: 15,304

[22] Filed: Feb. 17, 1987

[30] Foreign Application Priority Data

Feb. 15, 1986 [DE]  Fed. Rep. of Germany ....... 3604862

[51] Int. Cl.⁴ .......................... B64D 3/00; B64C 37/02
[52] U.S. Cl. ...................................... 244/2; 244/137.4
[58] Field of Search .................. 244/2, 3, 6, 137.4, 244/135 A

[56] References Cited

U.S. PATENT DOCUMENTS

| 1,792,738 | 2/1931 | Hall | 244/2 |
| 1,869,506 | 8/1932 | Richardson | 244/2 |
| 2,653,777 | 9/1953 | Barkey | 244/2 |
| 2,843,337 | 7/1958 | Bennett | 244/2 |
| 4,267,987 | 5/1981 | McDonnell | 244/2 |
| 4,298,176 | 11/1981 | Kendall | 244/135 A |

*Primary Examiner*—Galen Barefoot
*Assistant Examiner*—Rodney Corl
*Attorney, Agent, or Firm*—Walter Ottesen

[57] ABSTRACT

The invention is directed to a method and arrangement for providing safe vertical landing of airplanes, which are not provided with VTOL equipment or which are hindered with respect to their actual flight capabilities, as well as for providing extrinsically supported zero-run takeoff of airplanes. An airplane equipped with lower takeup means is coupled in flight to upper takeup means carried by a rotary wing aircraft flying above the airplane. The rotary wing aircraft generates the propulsion necessary to transport the airplane and the lifting force and sets it down vertically. Zero-run takeoff is initiated by lifting the airplane and accelerating it into its direction of flight by the rotary wing aircraft. When sufficient height, speed against wind and self-propulsion are gained, the airplane releases the connection to the upper takeup means and flies without assistance.

13 Claims, 2 Drawing Sheets

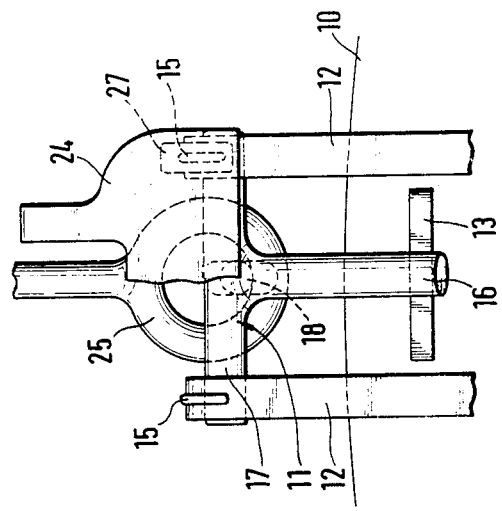
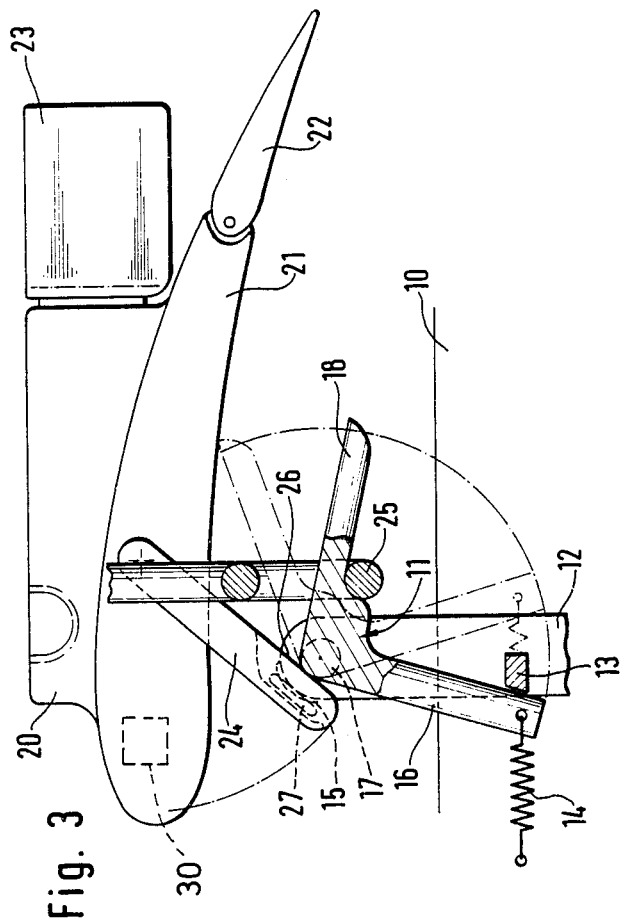
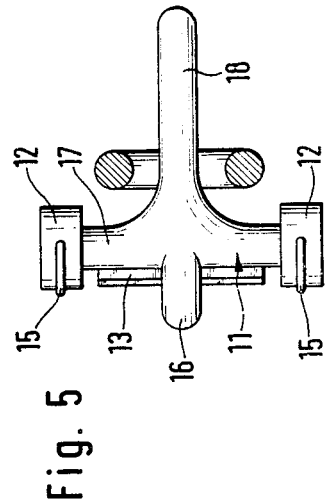

METHOD AND ARRANGEMENT FOR PROVIDING SAFE VERTICAL LANDING OF AIRPLANES AND EXTRINSICALLY SUPPORTED ZERO-RUN TAKEOFF OF AIRPLANES

FIELD OF THE INVENTION

The invention relates to a method for picking up an airplane which is in flight or on ground. In civilian and military aviation, technical problems develop with respect to airplanes or are induced, due to which landing on intact and sufficiently long runways leads to damage, extended further damage and to total loss of those airplanes, their load and fatal loss of their crew and passengers. Similar damage occurs if an intact flying airplane cannot reach a sufficiently long or technically adequate runway in its actual flight range.

BRIEF DESCRIPTION OF THE PRIOR ART

U.S. Pat. No. 3,389,880 discloses a method of recovering a payload-carrying parachute system in which a rotary wing aircraft is brought above the parachute system, which cannot be controlled. To the underside of the rotary wing aircraft, a towline is attached, to the other end of which a grapple hook having a plurality of jags is fixed. This grapple hook is towed by flight maneuvers of the rotary wing aircraft in such a way that it grasps a small drogue parachute, which is positioned above and connected to a main parachute which carries the payload. The main parachute, as well as the drogue parachute are parts of the payload to be recovered. While the parachute system with its payload is in uncontrolled gravitational descent, the grapple hook must be towed, in a manner like fishing, into the drogue parachute. A pick-up of a payload, for example, an airplane resting on ground, release of it into controlled flight and re-pickup of that airplane, while in flight, are not possible with this system.

Only one pick-up of payload in flight and one emergency release of the payload are possible with the parachute system described above.

SUMMARY OF THE INVENTION

It is an object of the present invention to provide a method for setting down safely airplanes which are still in controlled flight but which are hindered due to technical problems on board. The method also permits airplanes which are airworthy and not equipped with VTOL equipment to be brought into a safe self-propelled flying condition without execution of a runway take-off. These planes can be either resting on hard ground or on water. It is also an object of the invention to provide an arrangement for carrying out the method.

The method of the invention includes the steps of: bringing a rotary wing aircraft equipped with upper takeup means over the airplane equipped with lower takeup means; remote-control coupling the upper takeup means and the lower takeup means to each other; and, remote-control uncoupling the upper takeup means from the lower takeup means after the airplane has reached a predetermined flying condition for the situation wherein the airplane is assisted in take-off or after the airplane is set down for the situation wherein the airplane is assisted in landing.

The airplane hindered to land safely can be a fixed-wing or a variable geometry airplane. While waiting for assistance, the airplane flies a straight course at a speed as low as possible to maintain a safe flying condition.

The rotary wing aircraft of adequate carrying capacity flies the same course above the airplane. As soon as the airplane and the rotary wing aircraft fly with nearly equal vectors of velocity, the upper takeup means of the rotary wing aircraft are guided remotely-controlled into a position where they couple to the lower takeup means of the airplane.

The airplane is decelerated by reducing the self-propulsion thereof. The rotary wing aircraft now provides the forces which are necessary for safe transport of the airplane. The safe vertical landing ends by putting the airplane onto a suitable rest surface and by decoupling the two takeup means via remote control.

To effect a zero-run take-off of an airplane which rests on a suitable support, the rotary wing aircraft guides the upper takeup means, which are hanging from the underside of the rotary wing aircraft, into a position above that airplane so that the takeup means can be coupled together. The manual assistance of a ground crew is possible during this step. After the two takeup means are coupled, the rotary wing aircraft lifts the airplane from its support and accelerates it into its direction of flight. As it speeds up, the airplane can be controlled better and its lifting force grows thereby reducing the load on the rotary wing aircraft.

As soon as the drive unit of the airplane provides sufficient propulsion and the speed of the airplane against air is high enough to enable a safe flying condition, the coupling of the two takeup means is released via remote control and the airplane leaves the upper takeup means of the rotary wing aircraft. The upper takeup means moves away upwardly and rearwardly as seen from the airplane.

According to a preferred feature of the method of the invention, TV viewing equipment is provided on the upper takeup means for viewing the coupling action. The TV viewing equipment serves as a viewing aid to the operator, who sits in the rotary wing aircraft. The TV pictures also can be used for ground control or for surveillance from an escort aircraft.

Pursuant to another feature of the invention, the upper takeup means is remotely controlled during the flight of the rotary wing aircraft. In this way, a precisely controlled transport of the upper takeup means to the point of coupling relative to the carrying rotary wing aircraft is effected.

According to another feature of the invention, the remote control and remote guidance of the upper takeup means of the rotary wing aircraft is effected with the aid of energy and signal transmitting conductors from the rotary wing aircraft. The remote control and remote guidance of the takeup means of the rotary wing aircraft is effected by radio signals pursuant to another feature of the invention.

A preferred embodiment of the method according to the invention provides that the coupling of the upper takeup means and the lower takeup means is opened from the cockpit of the airplane. This additional possibility to effect an uncoupling provides a desired quick disconnection of the airplane from the rotary wing aircraft.

This invention also relates to an arrangement for picking up an airplane such as a fixed-wing or a variable geometry airplane with the aid of a rotary wing aircraft. The airplane can be in controlled flight or at rest on ground. The arrangement of the invention includes: lower takeup means mounted on the airplane; upper takeup means carried by the rotary wing aircraft; remotely-controlled guidance means for guiding the upper takeup means relative to the rotary wing aircraft; and, coupling-uncoupling means for coupling and uncoupling the upper takeup means and the lower takeup means.

With this embodiment of the invention, a deliberate move of the upper takeup means to the lower takeup means of the airplane can be conducted within a determined range independently of the rotary wing aircraft.

According to another feature of the invention, the takeup means brought near to each other via remote control can be coupled and uncoupled intentionally.

The airplane to be taken up has a fuselage and the rotary aircraft has a lower wall. The lower takeup means is mounted on the fuselage and the upper takeup means is carried from the lower wall of the rotary wing aircraft. The coupling-uncoupling means is configured so as to cause the upper takeup means to be coupled with the lower takeup means in a form-tight manner. The upper takeup means includes a maneuverable unit remotely guided by the guidance means.

The maneuverable unit is movable in three translatory axes and in three rotational axes relative to the rotary wing aircraft. With this feature, a precise remote control for guidance of the upper takeup means during approach is possible.

The rotary wing aircraft includes energy supply means and control means and the maneuverable unit can be a small airplane suspended from the rotary wing aircraft. The arrangement can then further include transmitting means for transmitting energy and signals to the small airplane from the energy supply means and the control means. The transmitting means can be in the form of galvanic and/or light conductors for transmitting electrical currents and/or light signals. The small airplane of this embodiment of the invention provides an outstanding capability for remotely controlling the upper takeup means which now can grasp the airplane quickly and safely via its remotely-controlled coupling.

According to still another embodiment of the invention, the upper takeup means includes: a variable length towline for suspending the small airplane from the rotary wing aircraft; and, hoist means mounted on the rotary wing aircraft for changing the length of the towline.

By use of the towline, which is adjustable in length, the airplane becomes towable at a large distance from the rotary wing aircraft, which can be selected as required by the rescue conditions.

After pick-up of the airplane, the rotary wing aircraft tows the airplane below itself on the towline to which the remotely-controllable small airplane is attached, the small airplane being equipped with a remotely-controllable locking mechanism. Below the underside of the small airplane there is a carrying bail and TV viewing equipment.

The pivot lever rod is provided on the upper side of the airplane which is taken up. The pivot lever rod points rearward and is tilted downward and can be inserted into the carrying bail with the aid of relative movement between carrying bail and pivot lever rod.

The small airplane is guided by remote control so that it moves forwardly in the longitudinal direction at a sufficient distance above the airplane to be taken up. In this way the small airplane guides the carrying bail over the pivot lever rod so as to engage the latter. To secure this flexible connection, a locking flap mounted in the small airplane is guided to a position in front of the pivot lever rod and kept there so that the pivot lever rod cannot be withdrawn from the carrying bail without being intentionally changed in its position.

For uncoupling, two fundamentally different procedures, which can be combined, are possible.

While the pivot lever rod is in the locked position, the locking flap is moved into the rest position and then the carrying bail is removed from the pivot lever rod by moving the small airplane along the longitudinal axis of the airplane.

For the situation wherein the pivot lever rod is unlocked, the small airplane is lifted relative to the airplane without any change of the securing position of the locking flap with the carrying bail sliding rearwardly and upwardly off the pivot lever rod.

For providing of a zero-run take-off of an airplane at rest, the small airplane suspended on the vertical towline is accordingly moved for inserting the pivot lever rod into the carrying bail. After the locking flap is tilted into its securing position, the rotary wing aircraft lifts the airplane and accelerates it into a direction of flight. As soon as a stable flying condition of the airplane is reached, the pivot lever rod will be unlocked from its locking position and the airplane withdraws itself forwardly in the direction of flight thereby pulling the pivot lever rod out of the carrying bail.

With the invention, a method and arrangement are provided to safely land fixed wing airplanes and variable geometry airplanes which are not furnished with VTOL equipment or for which safe landing because of technical defects or because of insufficiently long runways is not possible without further damage. The invention also permits airworthy airplanes not furnished with VTOL equipment to become airborne even from the tightest space, that is, practically out of silo-like surroundings or shelters.

BRIEF DESCRIPTION OF THE DRAWINGS

The invention will now be described in greater detail with reference to the drawings wherein:

FIG. 3 shows a longitudinal schematic cross section taken along the vertical longitudinal plane of the airplane in the coupled state;

FIG. 4 shows in detail the lower and upper takeup means in mechanical contact in the coupled condition as well as the galvanic contacts; and, FIG. 5 is a plan view from above onto the lower takeup means.

DESCRIPTION OF THE PREFERRED EMBODIMENTS OF THE INVENTION

Figure 1:
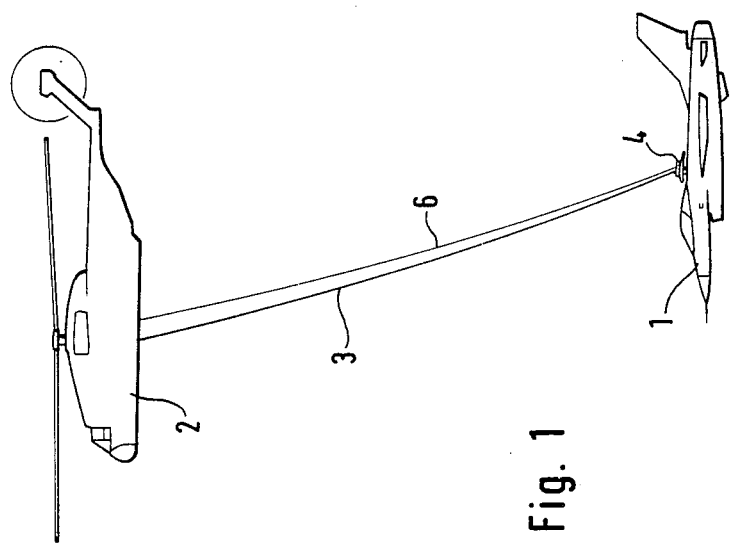
FIG. 1 is a schematic showing a rotary wing aircraft in flight, carrying an airplane.

The airplane 1 (hereinafter referred to as object 1) needing assistance for landing is equipped with the object-side lower takeup means (FIG. 5) and flies on straight course with lowest possible speed below the assistance-bringing rotary wing aircraft 2 (hereinafter referred to as recoverer 2) which is equipped with the upper takeup means and the part thereof which hangs on the towline 3 and is hereinafter referred to as duck 4 (see FIGS. 1 and 5). While the vectors of movement of the two aircraft are nearly equal and the vertical distance between duck 4 and object 1 is sufficiently small, the duck 4 is guided to the lower takeup means (FIG. 5) on the upper side of the fuselage 20 of object 1, using the reserve in length of the towline 3 and the duck's 4 maneuverability. The reserve in length of the towline is available because of the slack therein as seen in FIG. 1. During this action, the TV cameras act as a viewing aid to the operator, who may be a person in the case of a simple configuration of this combination of operational means for sporadic use and which may be a computer in the case of repeated use on objects such as certain military planes which are precisely known to the recoverer.

As soon as the carrying bail 25 of the duck 4 has taken up pivot lever rod 18 of the lower takeup means, the locking flap 24 will be closed and, via its resilient contacts, galvanic connection will be made between duck 4 and object 1. Via this connection, an exchange of information, free of disturbance from outside is made available between object 1 and recoverer 2. The self-propulsion of the object 1 will be reduced and the object 1 will be decelerated. For this, a small drag parachute attached to the tail of the object 1 can be helpful.

Figure 2:
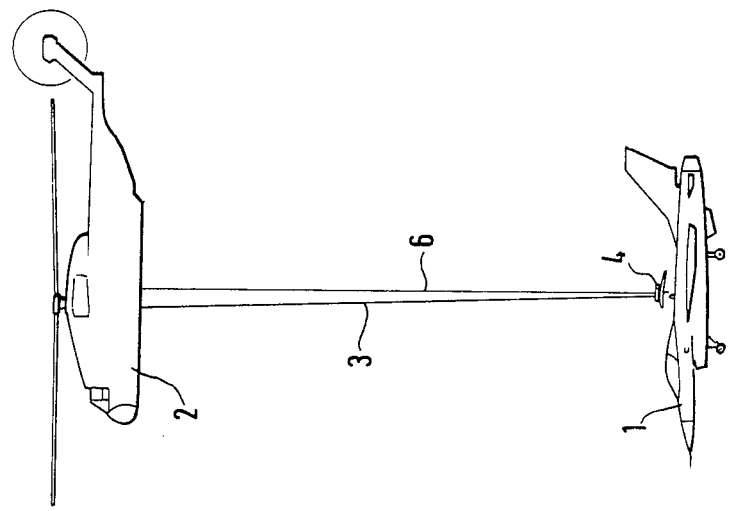
FIG. 2 shows an airplane, resting on ground, which is coupled with the upper takeup means of the rotary wing aircraft.

The propulsion of the object will be taken over by the recoverer 2 via towline 3. The recoverer 2 then: sets the recovered object 1 down at the predetermined rest location with a horizontal speed of zero or nearly zero; opens the locking flap 24 of the duck 4; pulls the carrying bail 25 off of the pivot lever rod 18 by suitable horizontal movement in the direction along the longitudinal axis of the object 1 from the front to the rear; and then withdraws (see FIG. 2).

From board of the object 1, a quick release of object 1 from recoverer 2 is effected by unlatching the locking bar 13, the latter preventing a rotative movement of lever rod 18 around its axis 17. The rod 18 then can be lifted with respect to the transverse axis of object 1 because of the forces which are effective in the coupling comprising the pivot lever rod 18 and the carrying bail 25. Consequently, the object 1, if being carried in flight, may disengage itself from the recoverer 2 by producing self-propulsion and, during set down, the object 1 can enable faster upward removal of the recoverer 2. After these movements of pivot lever rod 18, the pivot lever rod 18 will again be locked in its takeup position.

It is evident, that reversal of the steps of the procedure make possible zero-run take-off. For that purpose, the object 1 is taken up from its rest location by the recoverer 2 with the aid of the duck 4 and accelerated during horizontal carry-and-tow-flight, the duck 4 being secured to the object 1.

When object 1 has reached sufficient self-propulsion, the locking of pivot lever rod 18 is released and the separation of duck 4 from pivot lever rod 18 is effected. By suitable control operations on the part of the object 1 and the recoverer 2, collisions of the duck 4 and rudder of object 1 can be avoided.

On the upper side of the fuselage 10 of object 1 there is, seen in direction of flight, the lower takeup means (FIG. 5) mounted before the center of gravity behind an aerodynamic fairing, which is not shown here due to its little meaning for the method of the invention. The lower takeup means comprise the pivot lever 11, two bearing blocks 12, the locking bar 13 and the return spring 14. On the front-side quarter sections of the bearing blocks 12, there are provided respective bulge-shaped contacts 15 which are insulated with respect to the bearing blocks 12 and which are wired to the airplane's intercom.

In the takeup position of the lower takeup means (FIG. 5), the return spring 14, which acts on the lever arm 16 of elbow lever 11, pulls pivot lever arm 11 back so far that locking bar 13 blocks counterclockwise movement of pivot lever 11 about its axis 17, and that pivot lever rod 18 is tilted so as to be inclined downwardly. If the blocking bar 13 is removed by suitable drive means, the forces acting on lever rod 18 will lift the lever rod 18 with the aid of those components of these forces which are directed away from the object's fuselage 10 and which are effective in the plane which is defined by the vertical and longitudinal axes of the object 1. This effectively avoids unwanted coupling of object 1 to hoists.

The duck 4 is connected to the recoverer 2 via towline 3 and via the cable 6 containing energy and signal conductors. The duck 4 carries in its fuselage 20 and in the fixed wings 21 the drive units and position indicators (not shown) for elevator 22 and rudder 23, for brake flap, for locking flap 24 and at least two TV camera systems represented in FIG. 3 by block 30, illumination equipment for coupling maneuvers when light intensity is poor.

When not in operation and during no-load carrying flight of the duck 4, the locking flap 24 is nestled into the profile of the fixed wing 21.

After the carrying bail 25 has taken up the pivot lever rod 18 during execution of coupling maneuver between duck 4 and object 1, the locking flap 24 is moved counterclockwise (FIG. 3) under power toward carrying bail 25 until contact. In this action, the underside 26 of locking flap 24 touches the pivot lever axis 17 and thus prevents unwanted separation of pivot lever rod 18 out of carrying bail 25. During the state of being secured, the contact plates 27 press on the contacts 15 of the bearing blocks 12, the contact plates being attached to the locking flap so as to be resilient and electrically insulated.

Via the contacts 15 and the contact plates 27, an exchange of information becomes possible between recoverer 2 and object 1 which is free of outside disturbance.

The power-drive of the locking flap 24 braces itself on the carrying bail 25, which is pivotably and resiliently suspended in the duck 4. This embodiment of the active takeup means assures: a safe guidance of the carrying bail 25 onto the lever rod 18; a secure holding of the carrying bail 25 on the secured lever rod 18 during flight; and, a quick slip-off of the released lever rod 18 out of the carrying bail 25 for wanted separation during flight and when the object 1 is at rest on the ground.

It is understood that the foregoing description is that of the preferred embodiments of the invention and that various changes and modifications may be made thereto without departing from the spirit and scope of the invention as defined in the appended claims.

What is claimed is:

1. Arrangement for taking up an airplane, which has a fuselage and is at rest on the ground or in controlled flight, with the aid of a rotary wing aircraft, the arrangement comprising:

lower takeup means mounted on the airplane;

upper takeup means carried by the rotary wing aircraft;

remotely-controlled guidance means for guiding said upper takeup means relative to the rotary wing aircraft;

coupling-uncoupling means for coupling and decoupling said upper takeup means and said lower takeup means;

said lower takeup means being mounted on said fuselage;

said coupling-uncoupling means being configured so as to cause said upper takeup means to be coupled with said lower takeup means in a form-tight manner; and, said upper takeup means including: an aerodynamically maneuverable unit remotely guided by said guidance means so as to be movable in three translatory axes and in three rotational axes relative to the rotary wing aircraft; and, flexible supporting means for supporting said aerodynamically maneuverable unit from the rotary wing aircraft.

2. The arrangement of claim 1, comprising means for remotely actuating said coupling-uncoupling means to couple and uncouple said upper takeup means and said lower takeup means.

3. The arrangement of claim 1, wherein the rotary wing aircraft includes energy supply means and control means, said maneuverable unit being a small airplane suspended from the rotary wing aircraft; and, the arrangement further comprising transmitting means for transmitting energy and signals to said small airplane from said energy supply means and said control means.

4. The arrangement of claim 3, said flexible supporting means comprising a variable length towline for suspending said small airplane from said rotary wing aircraft; and, hoist means mounted on said rotary wing aircraft for changing the length of said towline.

5. The arrangment of claim 3, comprising a TV camera system mounted in said small airplane for transmitting video images to a receiver mounted in the rotary wing aircraft, on the ground or in an escort aircraft.

6. The arrangement of claim 1, said aerodynamically maneuverable unit being a small airplane suspended from the rotary wing aircraft by said flexible supporting means.

7. The arrangement of claim 1, said coupling-uncoupling means comprising release means actuable from within said airplane for opening the coupling of said upper takeup means and said lower takeup means.

8. Arrangement for taking up an airplane, which has a fuselage and is at rest on the ground or in controlled flight, with the aid of a rotary wing aircraft having a lower wall as well as energy supply means and control means, the arrangement comprising:

lower takeup means mounted on the airplane;

upper takeup means carried by the rotary wing aircraft;

remotely-controlled guidance means for guiding said upper takeup means relative to the rotary wing aircraft;

coupling-uncoupling means for coupling and decoupling said upper takeup means and said lower takeup means;

said lower takeup means being mounted on said fuselage;

said upper takeup means being carried from the lower wall of the rotary wing aircraft;

said coupling-uncoupling means being configured so as to cause said upper takeup means to be coupled with said lower takeup means in a form-tight manner;

said upper takeup means including a maneuverable unit remotely guided by said guidance means, said maneuverable unit being a small airplane suspended from the rotary wing aircraft;

transmitting means for transmitting energy and signals to said small airplane from said energy supply means and said control means;

said small airplane defining a longitudinal axis; and, said upper takeup means including a carrying bail defining a plane and mounted on the lower side of said small airplane so as to cause a normal to said plane to be substantially parallel to said longitudinal axis; said lower takeup means including:

frame means mounted on said fuselage of the airplane;

a lever mounted on said frame means and having a lever arm for engaging said carrying bail when said small airplane is brought into a coupling position above said fuselage;

said lever being pivotally mounted on said frame means so as to pivot in a vertical plane about a horizontal pivot axis between a locked position wherein said lever arm is inclined downwardly toward said fuselage and an unlocked position wherein said lever arm is inclined upwardly so as to point away from said fuselage; and, releasable locking means for locking said lever in said locked position.

9. The arrangement of claim 8, said upper takeup means including securing means for securing said carrying bail onto said lever arm.

10. The arrangement of claim 9, said securing means being a securing flap pivotally mounted on said small airplane for engaging said frame means to hold said carrying bail in place on said first lever arm.

11. The arrangement of claim 10, said lever being a two-arm lever having a second lever arm for coacting with said releasable locking means for holding said two-arm lever in said locked position.

12. The arrangement of claim 10, said arrangement comprising first electrical contact means mounted on said frame means, and second electrical contact means mounted on said securing flap for contact engaging said first electrical contact means when said securing flap engages said frame means for establishing an electrical connection between said upper takeup means and said lower takeup means.

13. The arrangement of claim 8, said releasable locking means being releasable from the cockpit of the airplane taken up by the arrangement.

* * * * *